United States Patent
Takahashi et al.

(10) Patent No.: US 10,175,684 B2
(45) Date of Patent: Jan. 8, 2019

(54) LASER PROCESSING ROBOT SYSTEM AND CONTROL METHOD OF LASER PROCESSING ROBOT SYSTEM

(71) Applicant: FANUC CORPORATION, Yamanashi (JP)

(72) Inventors: Hiromitsu Takahashi, Yamanashi (JP); Toshimichi Aoki, Yamanashi (JP); Masanobu Hatada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/833,349

(22) Filed: Dec. 6, 2017

(65) Prior Publication Data
US 2018/0164793 A1    Jun. 14, 2018

(30) Foreign Application Priority Data
Dec. 12, 2016 (JP) .................. 2016-240675

(51) Int. Cl.
*G05B 19/42* (2006.01)
*B23K 26/03* (2006.01)
*G05B 19/4103* (2006.01)
*G05B 19/41* (2006.01)

(52) U.S. Cl.
CPC ............ *G05B 19/42* (2013.01); *B23K 26/032* (2013.01); *G05B 19/41* (2013.01); *G05B 19/4103* (2013.01)

(58) Field of Classification Search
CPC .... G05B 19/41; G05B 19/4103; G05B 19/42; B23K 26/032
See application file for complete search history.

(56) References Cited

U.S. PATENT DOCUMENTS

2016/0346566 A1*  12/2016  Mercier ............... A61N 5/1031

FOREIGN PATENT DOCUMENTS

| JP | 2006187803 A | 7/2006 |
|---|---|---|
| JP | 2012-139711 A | 7/2012 |
| JP | 2012218029 A | 11/2012 |
| WO | 2017017054 A1 | 2/2017 |

* cited by examiner

*Primary Examiner* — Khoi H Tran
*Assistant Examiner* — Robert T Nguyen
(74) *Attorney, Agent, or Firm* — RatnerPrestia

(57) ABSTRACT

A laser processing robot system including a laser irradiation device that carries out an irradiation point shifting operation, a robot that moves the laser irradiation device, a laser irradiation device controller that controls the irradiation point shifting operation, and a robot controller that controls the robot. When moving the laser irradiation device by the robot, the robot controller instructs the robot on a plurality of first interpolated positions at every first interpolation period, and outputs a command value associated with the irradiation point shifting operation to the laser irradiation device controller at every second interpolation period shorter than the first interpolation period.

5 Claims, 5 Drawing Sheets

STEP A
(OBTAIN FIRST INTERPOLATED POSITIONS)

STEP B
(OBTAIN SECOND INTERPOLATED POSITIONS)

STEP C
(GENERATE MIRROR POSITION)

STEP D
(OUTPUT MIRROR POSITION COMMAND)

RELATED ART

LASER PROCESSING ROBOT SYSTEM AND CONTROL METHOD OF LASER PROCESSING ROBOT SYSTEM

CROSS-REFERENCE TO RELATED APPLICATIONS

This application is a new U.S. patent application that claims benefit of Japanese Patent Application No. 2016-240675, filed Dec. 12, 2016, the disclosure of this application being incorporated herein by reference in its entirety for all purposes.

BACKGROUND OF THE INVENTION

1. Field of the Invention

The present invention relates to a laser processing robot system that carries out laser processing by using a robot. The present invention also relates to a control method of a laser processing robot system.

2. Description of the Related Art

A laser processing robot system in which a laser irradiation device for irradiating an object with a processing laser beam is attached to the tip end of a robot arm and laser processing is carried out while moving the robot arm, has been known. In the laser processing using the laser processing robot system, a technique in which the robot arm is moved and simultaneously therewith the irradiation direction of the laser beam from the laser irradiation device is changed, so as to move the laser beam to scan a predetermined area and thereby carry out the laser processing on the area, has also been known. Welding, cutting, grooving, marking, etc., are specific examples of the laser processing.

In the above laser processing robot system, it is known that the orientation of the robot after a predetermined time has passed from a time point, at which the operation of the robot was controlled, is simulated and a scanner command associated with the operation of a laser scanner is outputted on the basis of the simulation result (see, e.g., Japanese Unexamined Patent Publication No. 2012-139711 (JP 2012-139711 A)).

SUMMARY OF THE INVENTION

In a configuration wherein the operation of a laser scanner is controlled to be synchronized with the operation of a robot based on a predetermined control period, even if a control period for the operation of the laser scanner is set shorter than the control period for the operation of the robot, the trajectory of an irradiation point of the laser from the laser scanner, with which the processed object is irradiated, will follow the operation of the robot, as illustrated in FIGS. 6A and 6B. In this configuration, the precision of the trajectory of the irradiation point of the laser depends on the control performance of the robot, and it may therefore be difficult to precisely carry out the laser processing.

One aspect of the present disclosure is a laser processing robot system including a laser irradiation device configured to irradiate an object with a laser beam and carry out an irradiation point shifting operation for shifting an irradiation point with the laser beam on a surface of the object; a robot configured to move the laser irradiation device; a laser irradiation device controller configured to control the irradiation point shifting operation of the laser irradiation device; and a robot controller configured to control the robot, wherein the robot controller is configured to determine a plurality of first interpolated positions by interpolating a plurality of target positions used for creating a motion trajectory of the laser irradiation device based on a first interpolation period, determine a plurality of second interpolated positions by interpolating an adjacent pair of the first interpolated positions based on a second interpolation period shorter than the first interpolation period, and generate a command value associated with the irradiation point shifting operation of the laser irradiation device at each of the plurality of second interpolated positions; and when making the robot move along the motion trajectory, instruct the robot on the plurality of first interpolated positions at every first interpolation period and output the command value to the laser irradiation device controller at every second interpolation period.

Another aspect of the present disclosure is a control method configured to control an operation of a robot and control an irradiation point shifting operation of a laser irradiation device attached to the robot, so as to carry out laser processing by irradiating an object with a laser beam from the laser irradiation device, the method including determining a plurality of first interpolated positions by interpolating a plurality of target positions used for creating a motion trajectory of the laser irradiation device based on a first interpolation period, determining a plurality of second interpolated positions by interpolating an adjacent pair of the first interpolated positions based on a second interpolation period shorter than the first interpolation period, and generating a command value associated with the irradiation point shifting operation of the laser irradiation device at each of the plurality of second interpolated positions; and when making the robot move along the motion trajectory, instructing the robot on the plurality of first interpolated positions at every first interpolation period and outputting the command value at every second interpolation period to control the irradiation point shifting operation.

According to the above-described aspects, more precise laser processing can be carried out by controlling both the robot and the laser irradiation device.

BRIEF DESCRIPTION OF THE DRAWINGS

The objects, features and advantages of the present disclosure will become more apparent from the following description of the embodiments in connection with the accompanying drawings, wherein.

DETAILED DESCRIPTION

Figure 1:
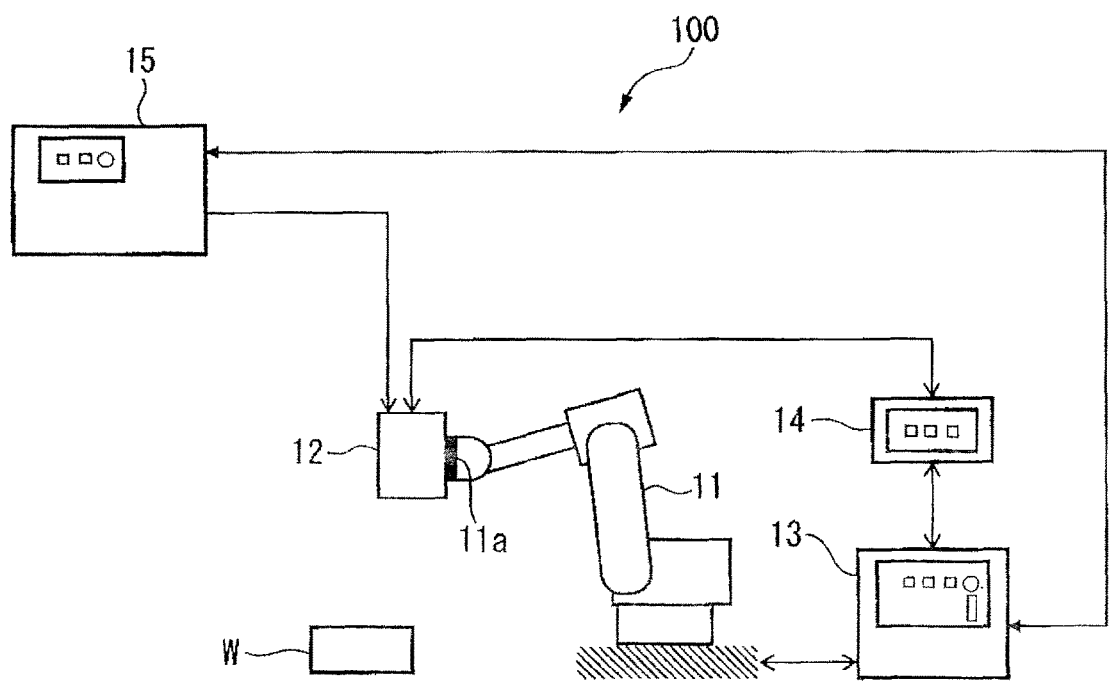
FIG. 1 is a diagram schematically illustrating a laser processing robot system according to an embodiment.

An embodiment of the present, disclosure will be described below with reference to the accompanying drawings. Throughout the drawings, corresponding components are denoted by common reference numerals.

FIG. 1 schematically illustrates a laser processing robot system 100 according to one embodiment.

The laser processing robot system 100 includes a laser irradiation device 12, a robot 11 that operates to move the laser irradiation device 12, a robot controller 13 that controls the robot 11, and a laser irradiation device controller 14 that controls the laser irradiation device 12. The laser processing robot system 100 further includes a laser oscillator 15 connected to the laser irradiation device 12.

The robot 11 is, for example, an articulated robot that moves the laser irradiation device 12, which is mounted on a tip end 11a of a robot arm (hereinafter referred to as a "robot end"), to a desired positron in a workspace. Although a vertical articulated robot is illustrated in FIG. 1, the present invention is not limited thereto. The laser processing robot system 100 uses the laser irradiation device 12 mounted on the robot end 11a to carry out laser processing on a workpiece W, which is an object to be processed. The "laser processing" includes laser welding, laser cutting, laser grooving, etc.

The laser irradiation device 12 includes a laser scanning mechanism, (known as, e.g., a galvano-scanner) that irradiates the workpiece W with a laser beam supplied from the laser oscillator 15 and changes the position of irradiation (i.e., the irradiation point) of the laser beam on the surface of the workpiece W as desired. The operation for shifting the irradiation point carried out by the laser scanning mechanism will be hereinafter referred to as an "irradiation point shifting operation".

The robot controller 13 is configured, on the basis of a plurality of target positions used for creating a motion trajectory of the laser irradiation device 12 attached to the robot end 11a, to determine a plurality of first, interpolated positions by interpolating a pair of mutually-adjacent target positions based, on a predetermined first interpolation period, and determine a plurality of second interpolated positions by further interpolating a pair of mutually-adjacent first interpolated positions based on a predetermined second interpolation period that is shorter than the first interpolation period. The robot controller 13 is configured to generate a command value associated with the irradiation position of the laser beam from the laser irradiation device 12 (i.e., associated with the irradiation point shifting operation) at each of the determined second interpolated positions. Furthermore, the robot controller 13 is configured, when making the robot 11 move along the aforementioned motion trajectory and moving the laser irradiation device 12, to instruct the robot 11 on the determined first interpolated positions at every first interpolation period and output the generated command value to the laser irradiation device controller 14 at every second interpolation period within the first interpolation period.

The laser irradiation device controller 14 controls the irradiation point shifting operation of the laser irradiation device 12. The laser irradiation device controller 14 may be incorporated into the robot controller 13, so as to simplify the overall configuration, of the laser processing robot system 100.

The first interpolation period, is provided to be greater than or equal to a minimum control period that allows the robot controller 13 to control the operation (i.e., the position and orientation) of the robot 11. The second interpolation period is provided, as a control period that allows the laser irradiation device controller 14 to control the irradiation point shifting operation of the laser irradiation device 12 (in particular, the galvano-scanner).

Figure 2:
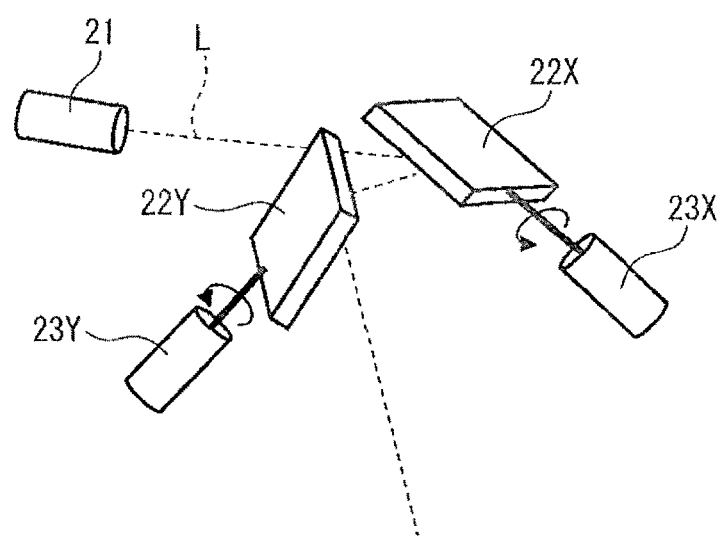
FIG. 2 is a diagram illustrating the schematic configuration of a galvano-scanner.

FIG. 2 illustrates the schematic configuration of the galvano-scanner provided in the laser irradiation device 12. The galvano-scanner includes a pair of reflective mirrors 22X and 22Y arranged in the optical path of a laser beam L emitted from a laser source 21 via a focusing lens (not illustrated), and motors 23X and 23Y that rotate the reflective mirrors 22X and 22Y, respectively, to desired angles. The reflective mirrors 22X and 22Y are also called galvano-mirrors.

Rotation shafts of the motors 23X and 23Y extend parallel to the reflective surfaces of the reflective mirrors 22X and 22Y, respectively, and are connected to the reflective mirrors 22X and 22Y as rotation shafts of the reflective mirrors 22X and 22Y, respectively. The rotation shafts of the motors 23X and 23Y are oriented in directions orthogonal to each other. Encoders (not illustrated) are provided on the rotation shafts of the motors 23X and 23Y to detect rotational positions (rotational angles) thereof.

In the above configuration, when one reflective mirror 22X in the pair of reflective mirrors 22X and 22Y is stopped and the other reflective mirror 22Y is rotated, the laser beam L is shifted to scan in, for example, the Y direction of orthogonal X and Y directions along the surface of the workpiece W. When the reflective mirror 22Y is stopped and the reflective mirror 22X is rotated, the laser beam L is shifted to scan in the X direction along the surface of the workpiece W. Thus, the laser beam L can be shifted for scanning, while setting an irradiation position of the laser beam L in the orthogonal X and Y directions along the surface of the workpiece W, by using the motors 23X and 23Y to rotationally drive the reflective mirrors 22X and 22Y to desired angles at every predetermined period, respectively.

The laser irradiation device controller 14 controls each of the motors 23X and 23Y that drive the galvano-scanner of the laser irradiation device 12, on the basis of the command value from the robot controller 13.

Specifically, the laser irradiation device controller 14 may be configured as a servo-amplifier. The laser irradiation device controller 14 receives, from the robot controller 13, the command value associated with the irradiation position of the laser beam from the laser irradiation device 12, for example, a command associated with the position or angle of the reflective mirror 22X, 22Y of the galvano-scanner (hereinafter referred to as a "mirror position command"), and outputs the command value to each motor 23X, 23Y. The laser irradiation device controller 14 controls each motor 23X, 23Y so that the value of the mirror position command coincides with the rotational angle detected by the encoder of the motor 23X, 23Y, so as to irradiate a target position on the surface of the workpiece W with the laser beam.

The robot controller 13 generates the mirror position command on the basis of a target laser trajectory (i.e., the path of the laser irradiation point during the laser processing) described in a work program, and outputs the command to the laser irradiation device controller 14. The work program is prepared in advance and stored in the robot controller 13.

Further, the robot controller 13 controls the operation of the robot 11 on the basis of the target position of the robot 11 described in the work program, and the actual position of the robot 11.

The robot controller 13 furthermore outputs a command value associated with irradiation conditions described in the work program to the laser oscillator 15. The command value includes laser power, pulse rate, duty ratio, etc., which are irradiation conditions of a pulse laser.

The laser oscillator 15 oscillates the laser beam on the basis of the command value associated with the irradiation conditions from the robot controller 13. The laser oscillator 15 carries out the laser oscillation to supply the laser beam to the laser irradiation device 12. Types of laser oscillators include a fiber laser, a $CO_2$ laser, a YAG laser, etc., but in the present disclosure, the type of the laser oscillator is not particularly limited as long as it can output a laser usable for processing.

Figure 3:
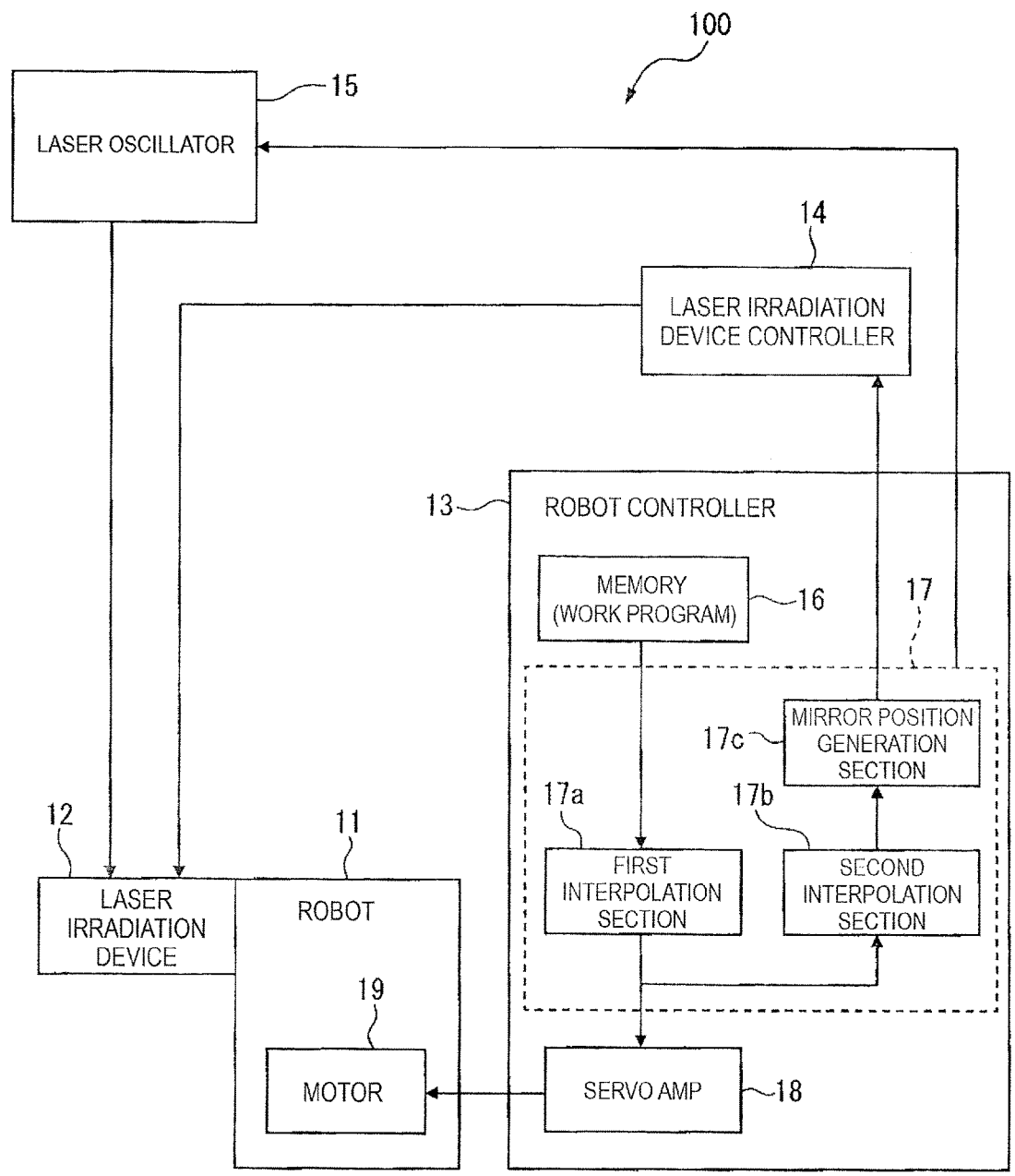
FIG. 3 is a block diagram illustrating a configuration of a laser processing robot system according to the embodiment.
Figure 4:
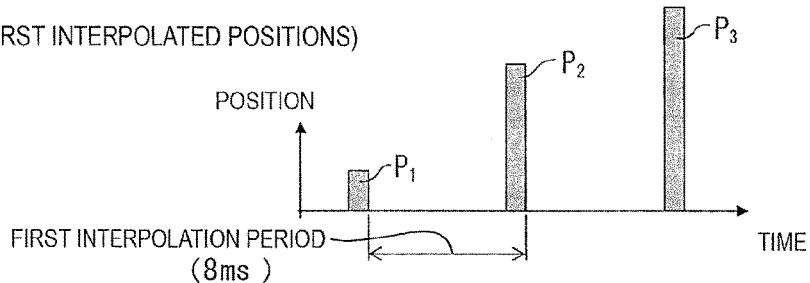
FIG. 4 is a schematic diagram illustrating functions of a robot controller illustrated in FIG. 3.
Figure 4:
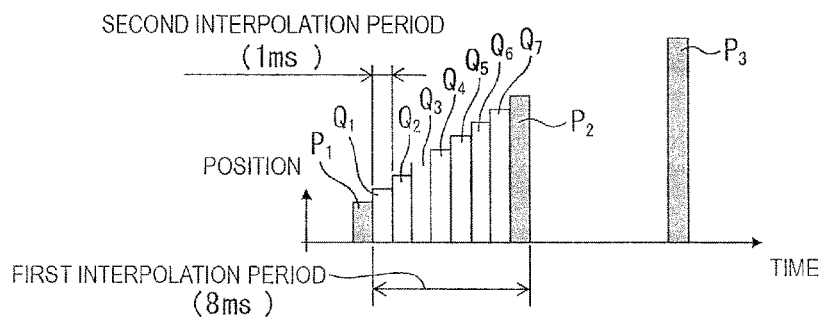
Figure 4:
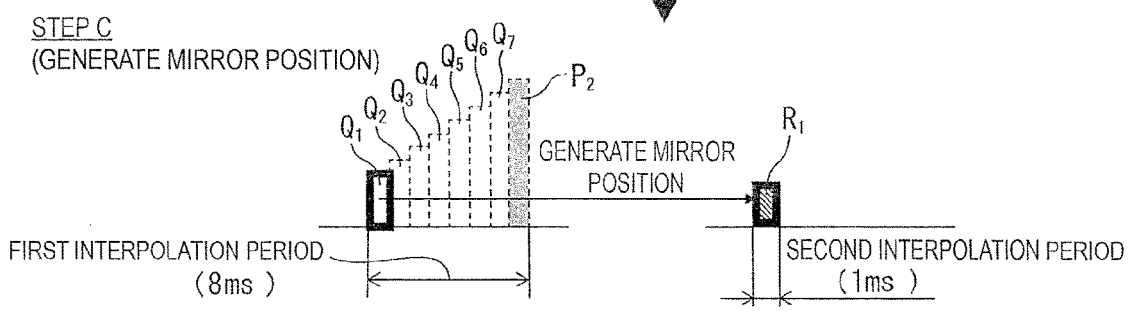
Figure 4:
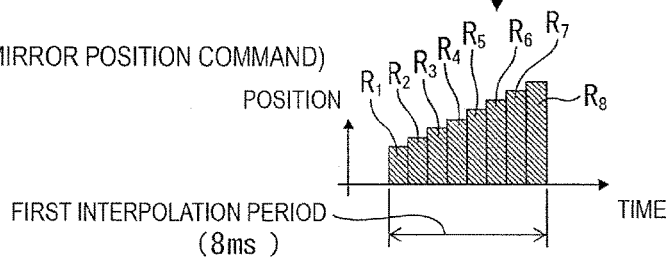

FIG. 3 illustrates the configuration of the laser processing robot system 100, in particular, the concrete configuration of the robot controller 13. FIG. 4 is a schematic diagram illustrating a processing sequence executed by the robot controller 13 of FIG. 3. With reference to FIGS. 3 and 4, the functions of exemplary components of the robot controller 13 and the processing sequence executed by the robot controller 13 will be described below.

The robot controller 13 includes a memory 16, an operation command section 17 and a servo-amplifier 18, for example. The servo-amplifier 18 may be provided outside the robot controller 13.

The memory 16 stores the work program in which a target laser trajectory along the surface of the workpiece W, processing operations including a target position of the robot 11, an irradiation condition of the laser oscillator 15, etc., are described. The memory 16 may also store a control period (or a period of processing a scanner command), based on which the operation of the galvano-scanner of the laser irradiation device 12 is controlled.

The operation command section 17 generates the mirror position command on the basis of the work program stored in the memory 16 and outputs the command to the laser irradiation device controller 14, and also outputs a command value associated with the irradiation conditions (e.g., a laser power value) described in the work program no the laser oscillator 15. Furthermore, the operation command section 17 generates a command, for moving the robot end 11a on the basis of the work program in the memory 16, and outputs the command to the servo-amplifier 18.

The servo-amplifier 18 controls a motor 19 that drive a joint axis of the robot 11 on the basis of the command from the operation command section 17. More specifically, the robot 11 is provided with a position detection sensor (e.g., an encoder) that detects the rotational position of the motor 19 of each joint axis. The servo-amplifier 18 provides the position commanded by the operation command section 17 to the motor 19 of each joint axis of the robot 11, and controls the motor 19 so that the rotational position of the motor 19 detected by the encoder coincides with the command position.

As illustrated in FIG. 3, the operation command section 17 includes a first interpolation section 17a, a second interpolation section 17b and a mirror position generation section 17c.

On the basis of a plurality of target positions (a motion start point, a motion end point, etc.) of the robot end 11a described in the work program, the first interpolation section 17a determines the plurality of first interpolated positions by interpolating an adjacent pair of target positions based on the predetermined first interpolation period.

More specifically, on the basis of information such as the plurality of target positions or a moving speed of the robot end 11a, an interpolation format, etc., described in the work program, the first, interpolation section 17a interpolates an adjacent pair of the target positions among the plurality of target positions, based on the predetermined first interpolation period. As a result, the plurality of first interpolated positions are obtained, based on the first interpolation period, as interpolated points on a trajectory connecting the plurality of target positions of the robot end 11a, which are used for creating the motion trajectory of the laser irradiation device 12. As already described, the first interpolation period is a period greater than or equal to a minimum control period, based on which the robot controller 13 can control the operation (the position and orientation) of the robot 11.

For example, if the first interpolation period is 8 ms, the first interpolation section 17a obtains data of a plurality of first interpolated positions $P_1$, $P_2$ and $P_3$ at every 8-ms period (step A in FIG. 4). In other words, the data of the plurality of first interpolated positions $P_1$, $P_2$ and $P_3$ is obtained as interpolated points set at every 8-ms period on a trajectory connecting the target positions (not illustrated) of the robot end 11a.

The first interpolation section 17a outputs the obtained first interpolated positions to the servo-amplifier 18, as well as to the second interpolation section 17b, as command positions for instructing the servo-amplifier 18 on the position of the robot end 11a. The servo-amplifier 18 controls the rotational position of the motor 19 of each joint axis of the robot 11 on the basis of the plurality of first interpolated positions sent from the first interpolation section 17a.

The second interpolation section 17b determines the plurality of second interpolated positions on the basis of the plurality of first interpolated positions sent from the first interpolation section 17a, by further interpolating an adjacent pair of the first interpolated positions among the plurality of first, interpolated positions based on the predetermined second interpolation period. As already described, the second interpolation period is a control period, based on which the laser irradiation device controller 14 controls the irradiation point shifting operation of the laser irradiation device 12 (or the galvano-scanner).

For example, if the second interpolation period is 1 ms, the second interpolation section 17b obtains data of a plurality of second interpolated positions $Q_1$ to $Q_7$, between the first interpolated position $P_1$ and the first interpolated position $P_2$, at every 1-ms period (step B in FIG. 4). Although not illustrated in FIG. 4, data of a plurality of second interpolated positions is also calculated between the first interpolated position $P_2$ and the first interpolated position $P_3$ at every 1-ms period.

The second interpolation section 17b outputs the obtained second interpolated positions to the mirror position generation section 17c. The mirror position generation section 17c generates an operation position of the galvano-mirror (hereinafter referred to as a "mirror position") for every second interpolated position. The mirror positions are generated on the basis of the obtained second interpolated positions, as well as the target laser trajectory described in the work program stored in the memory 16, the known specification or dimension of the components of the galvano-scanner, etc.

For example, as a process depicted at step C in FIG. 4, mirror positions of the galvano-mirror are generated for the second interpolated positions at every second interpolation period (1 ms) within the single first interpolation period (8 ms). FIG. 4 schematically illustrates, in step C, a state where data of a mirror position $R_1$ is generated for the second interpolated positron $Q_1$.

The mirror position generation section 17c generates data of a plurality of mirror positions $R_1$ to $R_8$ for the galvano-scanner (step D in FIG. 4) by executing the processing of step C.

Furthermore, during the first interpolation period (8 ms), the mirror position generation section 17c outputs the generated data of the plurality of mirror positions $R_1$ to $R_8$ to the laser irradiation device controller 14 as the mirror position command (step D in FIG. 4).

Figure 5A:
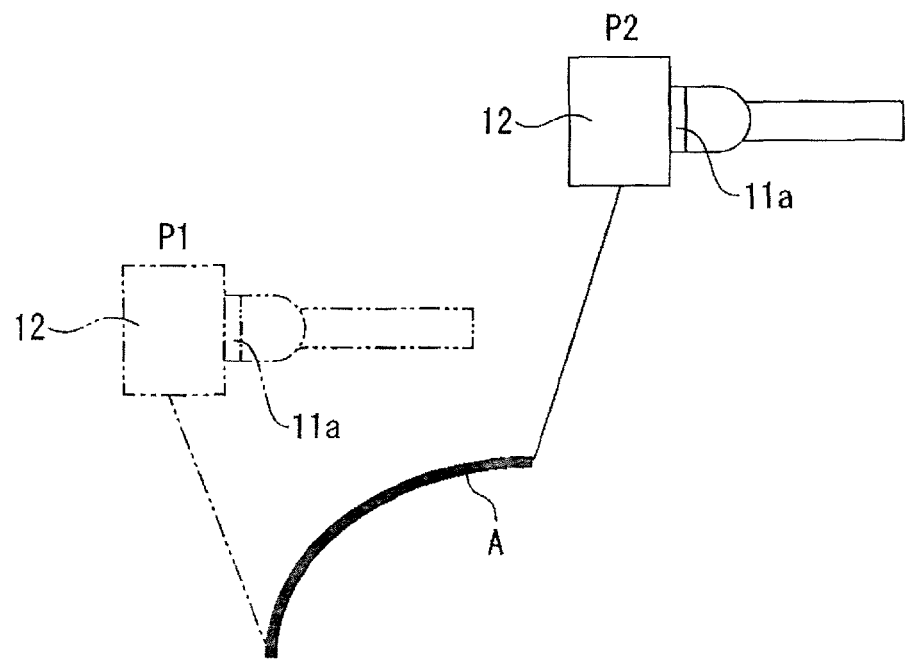
FIGS. 5A and 5B are diagrams illustrating effects of the embodiment.
Figure 5B:
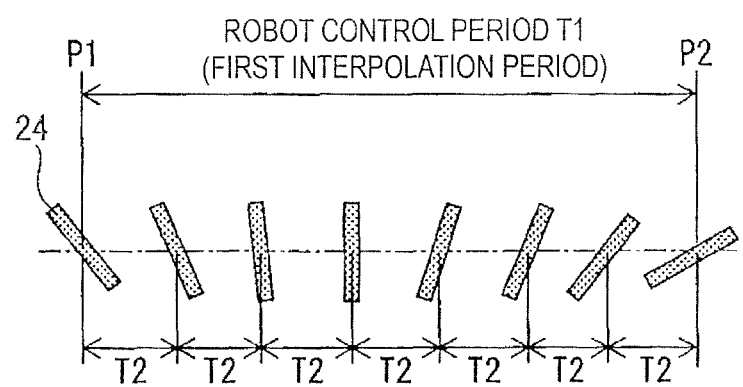
Figure 6A:
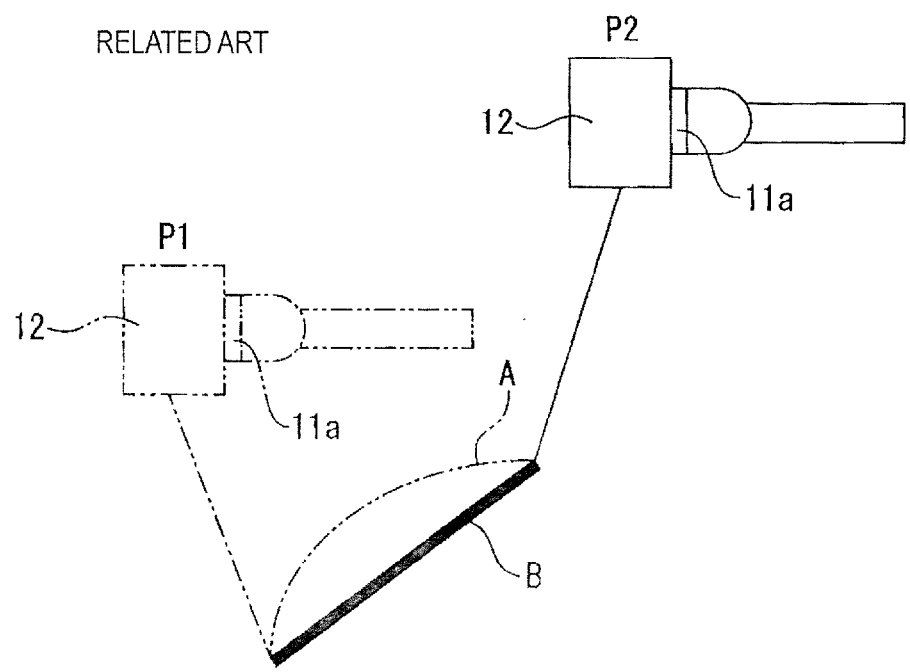
FIGS. 6A and 6B are diagrams illustrating a related art.
Figure 6B:
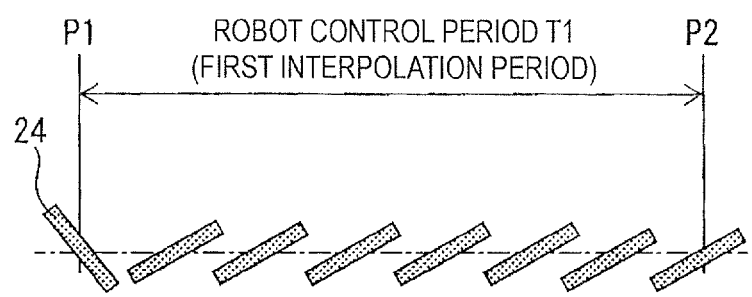

FIG. 5A schematically illustrates an exemplary operation of the laser processing robot system 100 when carrying out laser processing. FIG. 5B illustrates an exemplary motion of the galvano-mirror (schematically indicated by numeral 24) in a unit control period (or the first interpolation period) of the robot 11 during the laser processing illustrated in FIG. 5A. Effects of the present embodiment can be understood from FIGS. 5A and 5B. FIGS. 6A and 6B, on the other hand, are diagrams illustrating a related art, and correspond to FIGS. 5A and 5B, respectively.

For example, as illustrated in FIG. 5A, assuming that the robot end 11a on which the laser irradiation device 12 is mounted is moved linearly from a first interpolated position $P_1$ to a next first interpolated position $P_2$. At this time, as illustrated in FIG. 5B, the robot controller 13 (the operation command section 17) outputs the position command of the first interpolated positions $P_1$ to the robot 11 and also outputs the mirror position command of the second interpolated positions $Q_1$ to $Q_7$ (FIG. 4) to the laser irradiation device controller 14, so as to modify the mirror position of the galvano-mirror 24 in the unit control period (or the first interpolation period) T1 of the robot 11 to the mirror positions at every second interpolation period T2 shorter than the first interpolation period T1. As a result, the trajectory of the laser irradiation point along the surface of the object becomes a target laser trajectory A (e.g., an arc-shaped trajectory) as illustrated in FIG. 5A, rather than following a linear trajectory of the robot end 11a from the first interpolated position $P_1$ to the next first interpolated position $P_2$. Accordingly, it is possible to carry out precise laser processing by using the laser irradiation device 12 without being restricted by the control performance of the robot 11.

As opposed to this, according to the related art, when the irradiation point shifting operation of the laser irradiation device 12 is controlled to be synchronized with the control period for the robot 11 (or the first interpolation period), data corresponding to the second interpolated positions $Q_1$ to $Q_7$ (FIG. 4) is not obtained during a time when the robot end 11a is moved from the first interpolated position $P_1$ no the next first interpolated position $P_2$. Thus, if the laser irradiation device controller 14 attempts to control the galvano-mirror 24 at a control period (e.g., the second interpolation period) shorter than the control period for the robot 11, the galvano-mirror 24 will be rotated to a target angle only in the first control period just after the time point when the position command for the first interpolated position $P_1$ is outputted to the robot 11, and the galvano-mirror 24 cannot be controlled at the subsequent control periods (see FIG. 6B). As a result, the trajectory of the laser irradiation point along the surface of the object follows a linear trajectory of the robot end 11a from the first interpolated position $P_1$ to the next first interpolated position $P_2$, as indicated by a laser trajectory B illustrated in FIG. 6A. In other words, the trajectory precision of the irradiation point of the laser from the laser irradiation device 12 depends on the control performance of the robot, which may causes a problem such that it is difficult to carry out precise laser processing. Such a problem is solved by the laser processing robot system 100, as described above.

Note that the robot controller 13 according to the above-described embodiment may be configured by using a computer system including a storage unit, a central processing unit (CPU), a communication unit, etc., connected to each other by a bus, etc. The storage unit includes read-only memory (ROM), random access memory (RAM), or the like. The function or operation of the operation command section 17, the first interpolation section 17a, the second interpolation section 17b, the mirror position generation section 17c, etc., of the robot controller 13 may be realized by the CPU executing a program stored in the ROM.

Although the above embodiment describes a galvano-scanner (FIG. 2) as the laser scanning mechanism of the laser irradiation device 12, this is merely an example. The laser irradiation device according to the present invention may include any type of laser scanning mechanism.

Various embodiments of the present disclosure, and effects thereof, are listed below.

A first embodiment is a laser processing robot system 100 including a robot controller 13 that controls a robot 11 actuated to move a laser irradiation device 12, and a laser irradiation device controller 14 that controls the operation of the laser irradiation device 12. The laser irradiation device 12 irradiates a processed object with a laser beam and changes the position of the laser beam on the surface of the processed object. The robot controller 13 determines a plurality of first interpolated positions on the basis of a predetermined plurality of target positions for defining a motion trajectory of the laser irradiation device 12, by interpolating an adjacent pair of the target positions based on a predetermined first interpolation period, determines a plurality of second interpolated positions by further interpolating an adjacent pair of the first interpolated positions based on a predetermined second interpolation period shorter than the first interpolation period, and generates a command value associated with the position of irradiation of the laser beam emitted from the laser irradiation device 12 at each of the second interpolated positions. When making the robot 11 move the laser irradiation device 12, the robot controller 13 instructs the robot 11 on each of the first interpolated positions at every first interpolation period, and outputs the command value to the laser irradiation device controller 14 at every second interpolation period during the first interpolation period.

According to the first embodiment, when carrying out laser processing by controlling both the robot 11 and the laser irradiation device 12 attached thereto, the position of irradiation of the laser beam emitted from the laser irradiation device 12 can be controlled regardless of the control performance of the robot 11. More precise laser processing can thus be carried out.

A second embodiment is the laser processing robot system 100 wherein, in the first embodiment, the first interpolation period is a period greater than or equal to a minimum control period, based on which the robot controller 13 can control the position and orientation of the robot 11, and the second interpolation period is a control period, based on which the operation of the laser irradiation device 12 is controlled.

According to the second embodiment, even if the first interpolation period set for controlling the position and orientation of the robot 11 is longer than the control period set for controlling the operation of the laser irradiation device 12, precise laser processing can be carried out without being restricted by the control performance of the robot 11.

A third embodiment is the laser processing robot system 100 further including, in the first embodiment, a laser oscillator 15 that carries out laser oscillation to supply the laser beam to the laser irradiation device 12, and the robot controller 13 outputs a command value associated with irradiation condition including a laser power value to the laser oscillator 15.

According no the third embodiment, the laser power can be controlled in accordance with the operation of the laser irradiation device based on the second interpolation period shorter than the first interpolation period for controlling the position and orientation of the robot 11. Accordingly, the laser power can be finely adjusted when processing an object along a desired laser trajectory.

A fourth embodiment is the laser processing robot system 100 wherein, in any one of the first to third embodiments, the laser irradiation device controller 14 is incorporated into the robot controller 13.

According to the fourth embodiment, the laser processing robot system 100 can be simplified.

A fifth embodiment is a control method configured to control the position and orientation of a robot 11 and also control the operation of a laser irradiation device 12 attached to the robot 11 so as to carry out laser processing by irradiating a processed object with a laser beam from the laser irradiation device 12. The method includes determining a plurality of first interpolated positions on the basis of a predetermined plurality of target positions for creating a motion trajectory of the laser irradiation device 12, by interpolating an adjacent pair of the target positions based on a predetermined first interpolation period, determining a plurality of second interpolated positions by further interpolating an adjacent pair of the first interpolated positions based on a predetermined second interpolation period shorter than the first interpolation period, and generating a command value associated with the position of irradiation of the laser beam emitted from the laser irradiation device 12 at each of the second interpolated positions; and when making the robot 11 move the laser irradiation device 12, instructing the robot 11 on each of the first interpolated positions at every first interpolation period, and outputting the command value at every second interpolation period during the first interpolation period, so as to control the operation of the laser irradiation device.

According to the fifth embodiment, the same effects as the effects of the first embodiment can be achieved.

While the embodiments of the disclosure have been described, it will be understood, by those skilled in the art, that various changes or modifications may be made thereto without departing from the scope of the following claims.

The invention claimed is:

1. A control method configured to control an operation of a robot and control an irradiation point shifting operation of a laser irradiation device attached to the robot, so as to carry out laser processing by irradiating an object with a laser beam from the laser irradiation device, the method comprising:
determining a plurality of first interpolated positions by interpolating a plurality of target positions used for creating a motion trajectory of the laser irradiation device based on a first interpolation period, determining a plurality of second interpolated positions by interpolating an adjacent pair of the first interpolated positions based on a second interpolation period shorter than the first interpolation period, and generating a command value associated with the irradiation point shifting operation of the laser irradiation device at each of the plurality of second interpolated positions; and
when making the robot move along the motion trajectory, instructing the robot on the plurality of first interpolated positions at every first interpolation period and outputting the command value at every second interpolation period to control the irradiation point shifting operation.

2. A laser processing robot system comprising:
a laser irradiation device configured to irradiate an object with a laser beam and carry out an irradiation point shifting operation for shifting an irradiation point with the laser beam on a surface of the object;
a robot configured to move the laser irradiation device;
a laser irradiation device controller configured to control the irradiation point shifting operation of the laser irradiation device; and
a robot controller configured to control the robot,
wherein the robot controller is configured to:
determine a plurality of first interpolated positions by interpolating a plurality of target positions used for creating a motion trajectory of the laser irradiation device based on a first interpolation period, determine a plurality of second interpolated positions by interpolating an adjacent pair of the first interpolated positions based on a second interpolation period shorter than the first interpolation period, and generate a command value associated with the irradiation point shifting operation of the laser irradiation device at each of the plurality of second interpolated positions; and
when making the robot move along the motion trajectory, instruct the robot on the plurality of first interpolated positions at every first interpolation period and output the command value to the laser irradiation device controller at every second interpolation period.

3. The laser processing robot system of claim 2, wherein the first interpolation period is provided to be greater than or equal to a minimum control period allowing the robot controller to control an operation of the robot, and the second interpolation period is provided as a control period allowing the laser irradiation device controller to control the irradiation point shifting operation.

4. The laser processing robot system of claim 2, further comprising a laser oscillator configured to carry out laser oscillation to supply the laser beam to the laser irradiation device,
wherein the robot controller is configured to output a command value associated with irradiation condition including a laser power value to the laser oscillator.

5. The laser processing robot system of claim 2, wherein the laser irradiation device controller is incorporated into the robot controller.

* * * * *